United States Patent
Wu et al.

(10) Patent No.: US 12,051,907 B2
(45) Date of Patent: Jul. 30, 2024

(54) METHOD FOR CONTROLLING A RENEWABLE POWER PLANT DURING VOLTAGE EVENTS

(71) Applicant: VESTAS WIND SYSTEMS A/S, Aarhus N. (DK)

(72) Inventors: Dan Wu, Risskov (DK); Germán Claudio Tarnowski, Aarhus N (DK); Torsten Lund, Fredericia (DK); Kouroush Nayebi, Ikast (DK); Mu Wei, Solbjerg (DK); Uffe C Merrild, Bryrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 54 days.

(21) Appl. No.: 17/801,772

(22) PCT Filed: Feb. 3, 2021

(86) PCT No.: PCT/DK2021/050036
§ 371 (c)(1),
(2) Date: Aug. 23, 2022

(87) PCT Pub. No.: WO2021/170189
PCT Pub. Date: Sep. 2, 2021

(65) Prior Publication Data
US 2023/0089279 A1     Mar. 23, 2023

(30) Foreign Application Priority Data
Feb. 26, 2020   (DK) .......................... PA 2020 70124

(51) Int. Cl.
*H02J 3/38*     (2006.01)
*H02J 3/46*     (2006.01)

(52) U.S. Cl.
CPC ................. *H02J 3/381* (2013.01); *H02J 3/46* (2013.01); *H02J 2300/24* (2020.01); *H02J 2300/28* (2020.01)

(58) Field of Classification Search
CPC .......... H02J 3/381; H02J 3/46; H02J 2300/24; H02J 2300/28
(Continued)

(56) References Cited

U.S. PATENT DOCUMENTS

2010/0268393 A1   10/2010   Fischle et al.
2010/0332040 A1   12/2010   Garcia
(Continued)

FOREIGN PATENT DOCUMENTS

EP      2896101 A2        7/2015
WO      2013185772 A2    12/2013
(Continued)

OTHER PUBLICATIONS

Danish Patent and Trademark Office, 1st Technical Examination including the Search Report and Search Opinion for Application PA 2020 70124 dated Sep. 10, 2020.
(Continued)

*Primary Examiner* — Hal Kaplan
(74) *Attorney, Agent, or Firm* — Patterson + Sheridan, LLP

(57) ABSTRACT

Controlling a current injected to a power grid from a renewable power plant, in response to a voltage event in the power grid. At least a current at a point of common coupling between the renewable power plant and the power grid is determined and provided to a power plant controller (PPC). The PPC derives individual current setpoint corrections for at least some wind turbines, based on the determined current, and dispatches each derived current setpoint correction to wind turbine controllers of the corresponding wind tur-
(Continued)

bines. The wind turbine controllers control a current output of the respective wind turbines, based on measurements of current and/or voltage at a point of connection between the wind turbine and an internal grid of the renewable power plant, and by taking into account the dispatched current setpoint correction.

19 Claims, 5 Drawing Sheets

(58) Field of Classification Search
USPC .......................................................... 307/82
See application file for complete search history.

(56) References Cited

U.S. PATENT DOCUMENTS

| | | |
|---|---|---|
| 2015/0137520 A1 | 5/2015 | Garcia |
| 2015/0211492 A1* | 7/2015 | Garcia ................... F03D 7/048 290/44 |
| 2016/0134121 A1 | 5/2016 | Bartsch |
| 2018/0335020 A1 | 11/2018 | Ayiranazhi Cailakam et al. |

FOREIGN PATENT DOCUMENTS

| | | | |
|---|---|---|---|
| WO | WO-2016000220 A1 * | 1/2016 | ............. F03D 9/255 |
| WO | 2019052614 A1 | 3/2019 | |
| WO | 2021170189 A1 | 9/2021 | |

OTHER PUBLICATIONS

PCT, Notification of Transmittal of the International Search Report and the Written Opinion of the International Searching Authority, or the Declaration for Application PCT/DK2021/050036 dated May 10, 2021.

* cited by examiner

METHOD FOR CONTROLLING A RENEWABLE POWER PLANT DURING VOLTAGE EVENTS

FIELD OF INVENTION

The present invention relates to a method for controlling a renewable power plant during voltage events. More particularly, the method according to the invention allows a dynamic and accurate current injection from a renewable power plant to a power grid when such a voltage event is detected.

BACKGROUND OF THE INVENTION

Power grids are typically designed to operate within a specified voltage range, defined by the grid codes of a country or an area. A grid code is a technical specification that defines the requirements that a supplier, for instance a renewable power plant, such as a wind power plant, or a consumer, has to meet in order to ensure secure operation of the power grid. For instance, a grid code may include specifications regarding a specified operating range for a voltage of the power grid. In the case that the voltage of the power grid moves outside the specified operating range, there is a risk that the power grid becomes unstable, if appropriate remedial actions are not taken. When the voltage of the power grid moves outside the specified voltage range, this is sometimes referred to as a voltage event, or as an over-voltage event or an under-voltage event, depending on whether the voltage is too high or too low.

It is, thus, necessary to control the power suppliers and/or the power consumers of the power grid in a manner which ensures that the voltage of the power grid is maintained within the specified range. This is normally done by requesting some of the suppliers or some of the consumers to increase or decrease production or consumption of reactive power, depending on the voltage event.

Suppliers, such as renewable power plants, are known to provide power grid support during voltage events in the power grid. Wind turbines of wind power plants or hybrid power plants can for instance provide voltage support to the power grid by providing a reactive current depending on the change in power grid voltage. Existing wind turbines may, e.g., provide reactive current to the power grid, based on information obtained locally at a point of connection of each wind turbine within the wind power plant. This is a dynamic manner of providing power grid support during voltage events in the power grid, in the sense that a fast reaction to a detected voltage event can be provided. However, since the wind turbines are, in this case, controlled based on local measurements of relevant control parameters, the control of the wind turbines is not taking conditions in the power grid and/or at the point of common coupling between the wind power plant or hybrid power plant and the power grid into account. Since such conditions may very well differ from the conditions prevailing locally at the position of the individual wind turbines, e.g. due to line impedance and/or transformer impedance of the system, the reactive current provided by the wind turbines may not accurately counteract a voltage event occurring in the power grid. Accordingly, the total reactive current provided by the power producer of the wind power plant or hybrid power plant to the power grid may not mitigate an occurring voltage event in an accurate manner.

U.S. Pat. No. 9,631,608 B2 discloses a method for controlling a power output of a wind power plant in the event of a transient low-voltage fault in a power grid. The wind power plant comprises a power plant controller that, after the low-voltage fault is detected, continues to control the wind turbines during the fault stage to ride through the power grid fault, by calculating and providing active power setpoints and reactive power setpoints to the wind turbines, e.g. based on measurements of the grid voltage at a point of common coupling between the wind power plant and the power grid.

DESCRIPTION OF THE INVENTION

It is an object of embodiments of the invention to provide a method for controlling a current injection from a renewable power plant to a power grid, in response to a voltage event, which reacts dynamically as well as accurately to the voltage event.

The invention provides a method for controlling a current injected to a power grid from a renewable power plant, in response to a voltage event in the power grid, the renewable power plant comprising a plurality of wind turbines and a power plant controller, the method comprising the steps of:
detecting occurrence of a voltage event in the power grid,
determining at least a current at a point of common coupling between the renewable power plant and the power grid, and providing the determined current to the power plant controller,
the power plant controller deriving individual current setpoint corrections for at least some of the wind turbines within the renewable power plant, based on the determined current, the derived current setpoint corrections taking the detected voltage event in the power grid into account,
the power plant controller dispatching each derived current setpoint correction to wind turbine controllers of the corresponding wind turbines, and
the wind turbine controllers controlling current output of the respective wind turbines, based on measurements of current and/or voltage at a point of connection between the wind turbine and an internal grid of the renewable power plant, and taking the current setpoint correction dispatched from the power plant controller into account.

Thus, the method of the invention is a method for controlling a current injected to a power grid from a renewable power plant in the case that voltage events are occurring. In the present context the term 'power grid' should be interpreted to mean an interconnected electrical network for delivering electrical power from producers to consumers.

In the present context the term 'renewable power plant' should be interpreted to mean a plurality of renewable power generating units, such as wind turbines, photovoltaic cells, etc., arranged within a specified geographical area, and which shares some infrastructure, such as an internal grid, a point of common coupling with respect to the power grid, substations, access roads, etc. Examples of renewable power plants include, but are not limited to, wind power plants, hybrid power plants, wave power plants, and solar farms.

The renewable power plant comprises a plurality of wind turbines and a power plant controller. Accordingly, the renewable power plant being controlled in accordance with the method according to the present invention is of a kind which comprises wind turbines, i.e. a wind power plant or a hybrid power plant.

In the present context the term 'power plant controller' should be interpreted to mean a controller which is configured to handle overall control of the renewable power plant. This includes controlling the renewable power generating units, including the wind turbines, in a manner such that requirements defined by, e.g., the grid codes are fulfilled. This may, e.g., include requirements for a certain frequency level, a specified voltage range, handling of contingencies, such as voltage events occurring in the power grid, etc. Accordingly, the power plant controller is communicatively connected to the wind turbines, and is therefore able to provide control signals to each of the wind turbines, and may further be able to receive feedback and signals regarding status of each wind turbine, e.g. in terms of operational status, various capabilities, availability, etc.

The current injected to the power grid from the renewable power plant may comprise a reactive part and/or an active part. Thus, the current setpoint correction may consist of a reactive part and/or an active part e.g. defining a desired correction for the reactive current and/or the active current of the wind turbine output.

In the method according to the invention, it is initially detected that a voltage event is occurring. i.e. that the voltage in the power grid is outside a specified voltage range. The voltage range may, e.g., be specified by the grid codes of a country or an area. The detected voltage event may, e.g., be an over-voltage event, in the case that the voltage in the power grid is above the specified voltage range, or it may be an under-voltage event, in the case that the voltage in the power grid is below the specified voltage range.

Next, at least a current at a point of common coupling between the renewable power plant and the power grid is determined and provided to the power plant controller. The point of common coupling may be seen as the physical interface between the power grid and the renewable power plant, i.e. the point where the renewable power plant is coupled to the interconnected electrical network. The current determined at the point of common coupling may thus be the current injected to the power grid from the renewable power plant.

The determination of the current at the point of common coupling may, e.g., be performed by direct measurements. The direct measurements may, e.g., be performed by means of power meters, ampere meters, etc. As an alternative, the current may be derived from other parameters, which could be measured. For instance, the current may be derived from a measured voltage at the point of common coupling and/or from a measured power flow.

Next, the power plant controller derives individual current setpoint corrections for at least some of the wind turbines within the renewable power plant, based on the determined current. In the present context the term 'individual current setpoint correction' should be interpreted to mean that, for a given wind turbine, a current setpoint correction to be applied for that wind turbine is derived. The current setpoint corrections may be identical for the respective wind turbines or they may differ from one wind turbine to another. This will be described in further detail below.

Since the current setpoint corrections are derived based on the current determined at the point of common coupling, the derived current setpoint corrections will reflect the determined current. Accordingly, any variations in the current at the point of common coupling will be accurately reflected in corresponding variations in the current setpoint corrections, and thereby the current setpoint corrections can accurately handle the actual conditions at the point of common coupling.

Furthermore, the derived current setpoint corrections take the detected voltage event in the power grid into account, i.e. they reflect the detected voltage event, such as whether voltage of the power grid needs to be increased or decreased. Thus, the derived current setpoint corrections may either be positive or negative, depending on the detected voltage event. This will be described in further detail below.

Next, the power plant controller dispatches each derived current setpoint correction to wind turbine controllers of the corresponding wind turbines. Thus, the derived current setpoint corrections are provided from the power plant controller to each of the wind turbines controllers of the wind turbines. In the present context the term 'wind turbine controller' should be interpreted to mean a controller which is configured to handle control of the wind turbine during normal operation, e.g. in accordance with a power curve for the wind turbine. This may, e.g., include controlling pitching, yawing, electrical components, such as the generator of the wind turbine, etc.

Finally, the wind turbine controllers control current output of the respective wind turbines, based on measurements of current and/or voltage at a point of connection between the wind turbine and an internal grid of the renewable power plant, and taking the current setpoint correction dispatched from the power plant controller into account.

In the present context the term 'internal grid' should be interpreted to mean an electrical network within the renewable power plant to which each of the renewable power generating units, notable the wind turbines, are connected. The points of connection may be seen as the physical interfaces between the respective wind turbines and the internal grid of the renewable power plant, i.e., points where the respective wind turbines are connected to the internal electrical network of the renewable power plant. Thus, the current and/or voltage measured at the points of connection represent the current output and/or the voltage level of each wind turbine within the renewable power plant, and these measurements may be regarded as 'local' measurements with respect to the wind turbines.

Thus, the current output of each wind turbine is controlled on the basis of locally obtained measurements of current and/or voltage, and thereby the control of the wind turbines is dynamic. However, when controlling the wind turbines, the current setpoint corrections provided by the power plant controller are also taken into account. As described above, the current at the point of common coupling and the detected voltage event in the power grid are accurately reflected in the current setpoint corrections. Accordingly, the local control of the wind turbines is adjusted by a current setpoint correction which reflects the conditions occurring at the point of common coupling. Thereby the resulting control of the wind turbines is dynamic, due to the 'local' control, and at the same time the control of the individual wind turbines accurately follows any variations occurring at the point of common coupling, due to the current setpoint corrections being taken into account.

The current setpoint corrections may be in the form of fine tuning corrections for current setpoints of the individual wind turbines. Accordingly, the current setpoint corrections may be regarded as corrections used for fine tuning and/or adjusting the current output of the individual wind turbines, in the sense that the current setpoint corrections fine tune and/or adjust the locally based control of each wind turbine in accordance with variations at the point of common coupling and the power grid. In this case the step of the wind turbine controllers controlling current output of the respective wind turbines comprises fine tuning the control of the current output by the respective current setpoint corrections, e.g. by fine tuning current setpoints by the respective current setpoint corrections.

In the case that the renewable power plant is a hybrid power plant, other kinds of renewable power generating units, such as photovoltaic cells, battery energy storage systems, etc., may also contribute in handling voltage events in the power grid in a similar manner. For instance, such power generating units may also receive current setpoint corrections from the power plant controller, and adjust a locally based control essentially in the manner described above.

The step of deriving individual current setpoint corrections may comprise deriving identical current setpoint corrections for the respective wind turbines. According to this embodiment, all of the wind turbines receive identical current setpoint corrections from the power plant controller. For instance, the power plant controller may, based on the determined current, derive an overall current setpoint correction indicating how much more or how much less current is needed for handling the voltage event, and divide the overall current setpoint correction by the number of wind turbines participating in the handling of the voltage event. The result may then be applied as current setpoint corrections for the wind turbines.

Alternatively, the step of deriving individual current setpoint corrections may comprise deriving current setpoint corrections which differ from one wind turbine to another. According to this embodiment, each wind turbine receives a current setpoint correction from the power plant controller which is particular for that wind turbine, and the individual current setpoint corrections may be derived while taking conditions applying at the respective wind turbines into account. For instance, the power plant controller may, based on information related to each wind turbine and the determined current, derive current setpoint corrections, which are unique for each wind turbine.

The method may further comprise the step of each wind turbine controller providing information to the power plant controller regarding current correction capability of the wind turbine, and the step of deriving individual current setpoint corrections may be performed in accordance with the provided current correction capabilities. According to this embodiment, the individual wind turbine controllers report back to the power plant controller, to which extent they are capable of providing current correction to the power grid. The power plant controller then derives the current setpoint corrections based on this information. Accordingly, each wind turbine receives a current setpoint correction which is in accordance with a current correction capability reported by that wind turbine. Thereby it is ensured that none of the wind turbines is requested to provide a current correction which it is not capable of providing. Accordingly, it is ensured that all the wind turbines provide the requested corrections, and thereby it is ensured that the total correction provided to the power grid is sufficient to handle the detected voltage event.

Alternatively or additionally, the power plant controller may take other conditions of the wind turbines into account when deriving the individual current setpoint corrections.

For instance, the power plant controller may take fatigue levels of the wind turbines into account. Wind turbines with a high fatigue level may not be able to participate in the handling of the detected voltage event to the same extent as wind turbines with a lower fatigue level. Accordingly, the power plant controller may derive larger current setpoint corrections for wind turbines with low fatigue levels than for wind turbines with high fatigue levels.

As another example, the power plant controller may take the meteorological conditions prevailing at the position of each wind turbine into account. Meteorological conditions, such as wind speed, turbulence, etc., may vary across the renewable power plant, i.e. the wind conditions the wind turbines experience may change from one wind turbine to another. The current output of the wind turbines depends on the energy that each wind turbine is able to extract from the wind. Accordingly, the power plant controller may derive larger current setpoint corrections for wind turbines at positions with favourable wind conditions, e.g. wind turbines arranged upwind with respect to the current wind direction, than for wind turbines at positions with less favourable wind conditions.

As another example, the power plant controller may take the layout of the renewable power plant into account when deriving the current setpoint corrections. For instance, the power plant controller may derive smaller current setpoint corrections for wind turbines arranged fully or partly in wake than for wind turbines which are not.

As another example, the power plant controller may take the operation history of the wind turbines into account. For instance, the power plant controller may derive smaller current setpoint corrections for wind turbines which have a history of providing high output for extensive time periods than for wind turbines having a history of a somewhat lower output.

Finally, the power plant controller may take into account if some of the wind turbines are not operating. In this case such wind turbines will not receive a current setpoint correction, and the remaining wind turbines will receive an increased current setpoint correction.

The step of deriving individual current setpoint corrections may comprise deriving individual current setpoint corrections having a magnitude which depends on a severity of the detected voltage event. The severity of the detected voltage event may be a measure of how far the detected voltage event is from normal operating conditions of the power grid.

For instance, in the case that the voltage in the power grid is extremely outside a specified voltage range, i.e. the detected voltage is very far from the normal operating conditions of the power grid, current setpoint corrections with a large magnitude may be derived by the power plant controller, in order to handle the detected, extreme voltage event.

On the other hand, in the case that the voltage in the power grid is just outside the specified voltage range, i.e. the detected voltage is close to normal operating conditions of the power grid, current setpoint corrections with a low magnitude may be derived by the power plant controller, in order to handle the detected voltage event, because in this case only small adjustments in the current provided by the renewable power plant are necessary.

The step of detecting occurrence of a voltage event may comprise monitoring a voltage at the points of connection between the wind turbines and the internal grid of the renewable power plant, and determining that a voltage event is occurring in the case that a difference between the monitored voltage and a predefined voltage level exceeds a predefined threshold value for at least one wind turbine.

According to this embodiment, it is determined that a voltage event is occurring when a voltage at the position of a wind turbine, i.e. obtained locally with respect to the wind turbine, differs from a predefined voltage level by an amount which exceeds a predefined threshold value. The voltage monitored at the points of connection may represent the voltage level of each wind turbine within the renewable power plant, i.e. the monitored voltage may be regarded as 'local' monitoring of each wind turbine. Accordingly, a voltage event is detected in the case that at least one of the locally monitored points of connection results in a difference that exceeds the predefined threshold value.

The voltage at the points of connection may be monitored using various measurement devices such as phasor measurement units, power meters, etc. As an alternative, the voltage at the points of connection may be monitored from other parameters, which could be monitored. For instance, from a monitored current and/or a monitored power flow, the voltage at the points of connection may be derived, and hence monitored.

The predefined voltage level may, e.g., be the voltage level at the points of connection under normal operating conditions. In this case, the difference between the monitored voltage and the predefined voltage indicates how much the monitored voltage deviates from the voltage at normal operating conditions.

The predefined threshold value may indicate the maximum allowable difference between the actual voltage and the predefined voltage without risking critical voltage conditions. It may, e.g., be concluded that a voltage event is occurring when a difference exceeding a predefined threshold value of at least 5%, 6%, 8%, or 10% of the predefined voltage is detected.

Alternatively or additionally, the step of detecting occurrence of a voltage event may comprise monitoring a voltage at the point of common coupling between the renewable power plant and the power grid, and determining that a voltage event is occurring in the case that a difference between the monitored voltage and a predefined voltage level exceeds a predefined threshold value.

According to this embodiment, it is determined that a voltage event is occurring when a voltage monitored at the interface between the renewable power plant and the power grid, i.e. remotely with respect to the wind turbines, differs from a predefined voltage level by an amount which exceeds a predefined threshold value. Thus, according to this embodiment, the occurrence of the voltage event is detected at the point of common coupling, rather than at the points of connection of the individual wind turbines.

The voltage monitored at the point of common coupling may represent the voltage level of the power grid. The predefined voltage level may be the voltage level of the power grid under normal operating conditions. Hence the difference between the monitored voltage and the predefined voltage level may indicate how much the monitored voltage deviates from the voltage of the power grid under normal operating conditions. The voltage at the point of common coupling may be monitored, e.g., in the same manner as described above.

As described above, the predefined threshold value may indicate the maximum allowable difference between the actual voltage at the point of common coupling and the predefined voltage without risking critical voltage conditions in the power grid.

The method may further comprise the step of determining a voltage at the point of common coupling, and providing the determined voltage to the power plant controller, and the step of deriving individual current setpoint corrections may further be based on the determined voltage. According to this embodiment, the power plant controller derives individual current setpoint corrections based on the determined current as well as on the voltage determined at the point of common coupling.

The voltage at the point of common coupling may be determined using direct measurements, similarly to the manner in which the current can be measured. As an alternative, the voltage may be derived from other parameters, which could be measured.

Since the current setpoint corrections are further derived based on the determined voltage, the derived current setpoint corrections will reflect the determined voltage. Accordingly, any variations in the voltage at the point of common coupling will be accurately reflected in corresponding variations in the current setpoint corrections, and thereby the current setpoint corrections can accurately handle the actual voltage conditions at the point of common coupling.

The voltage event may be an under-voltage event, and the individual current setpoint corrections may be positive. According to this embodiment, the voltage level in the power grid is below a specified voltage range. In the case of an under-voltage event, an increased current may be required from the renewable power plant in order to handle the under-voltage event. Accordingly, in this case the power plant controller derives positive current setpoint corrections for the wind turbines, and thereby the voltage level in the power grid is increased when the wind turbines adjust their current control by the current setpoint corrections.

Alternatively, the voltage event may be an over-voltage event, and the individual current setpoint corrections may be negative. According to this embodiment, the voltage level in the power grid is above a specified voltage range. In the case of an over-voltage event, a decreased current may be required from the renewable power plant in order to handle the over-voltage event. Accordingly, in this case the power plant controller derives negative current setpoint corrections for the wind turbines, and thereby the voltage level in the power grid is decreased when the wind turbines adjust their current control by the current setpoint corrections.

The step of controlling the current output of the respective wind turbines may comprise, for each wind turbine:
  providing a current setpoint,
  adding the dispatched current setpoint correction to the current setpoint, thereby obtaining a corrected current setpoint, and
  controlling the current output of the wind turbine in accordance with the corrected current setpoint.

According to this embodiment, the individual wind turbines are controlled in accordance with a setpoint control strategy.

Initially, a current setpoint is provided. The current setpoint may be the setpoint which is applicable under normal operating conditions, i.e. when a voltage event is not occurring. Thus, under normal operating conditions, each wind turbine controller may control the current output of the wind turbine in accordance with its corresponding current setpoint.

In the case that occurrence of a voltage event is detected, the power plant controller derives and dispatches current setpoint corrections to at least some wind turbines within the renewable power plant, in the manner described above. This current setpoint correction is added to the current setpoints for the respective wind turbines, thereby obtaining a corrected current setpoint. Thus, the current setpoint is adjusted by the current setpoint correction, which reflects the conditions occurring at the point of common coupling. Accordingly, the corrected current setpoint reflects the current setpoint under normal operating conditions but adjusted in accordance with the conditions occurring at the point of common coupling.

Finally, the current output of the wind turbine is controlled in accordance with the corrected current setpoint. Thus, the wind turbines are still controlled in accordance with a standard setpoint control strategy and based on local measurements. However, the applied setpoint value is the corrected current setpoint, i.e. it takes conditions occurring at the point of common coupling into account.

BRIEF DESCRIPTION OF DRAWINGS

The invention will now be described in further detail with reference to the accompanying drawings in which.

DETAILED DESCRIPTION OF THE DRAWINGS

Figure 1:
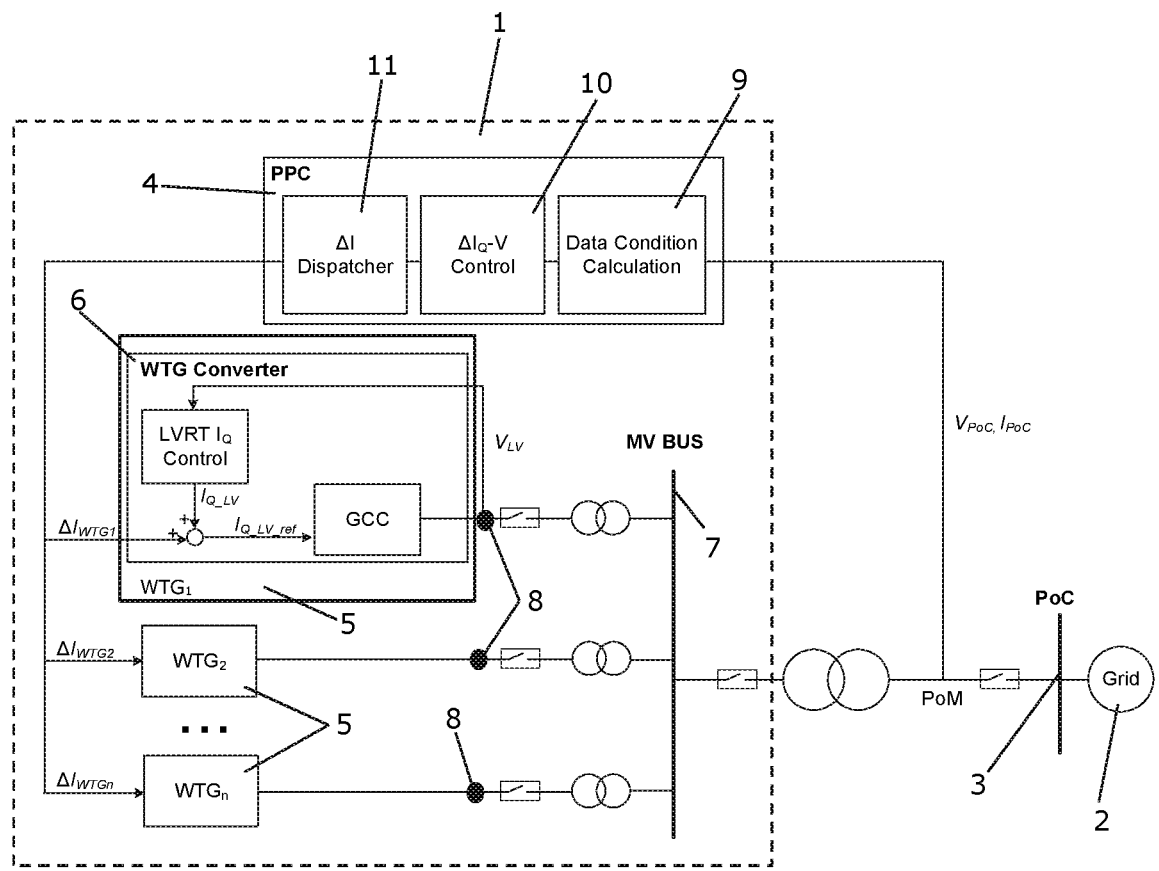
FIG. 1 is a diagrammatic view of a renewable power plant being controlled in accordance with a method according to an embodiment of the invention.

FIG. 1 is a diagrammatic view of a renewable power plant 1 being controlled in accordance with a method according to an embodiment of the invention. The renewable power plant 1 is connected to a power grid 2 via a point of common coupling 3. The renewable power plant 1 comprises a power plant controller 4 and a plurality of wind turbines 5, each wind turbine 5 comprising a wind turbine controller 6. The wind turbine controller 6 is only shown for one of the wind turbines 5. It should, however, be understood, that each of the wind turbines 5 is provided with such a wind turbine controller 6. Furthermore, each wind turbine 5 is connected to an internal grid 7, via a point of connection 8 between the respective wind turbines 5 and the internal grid 7 of the renewable power plant 1.

The renewable power plant 1 of FIG. 1 may be controlled in the following manner. Initially it is detected that a voltage event is occurring in the power grid 2. This could, e.g., include detecting that a voltage monitored at the point of common coupling 3 differs from a predefined voltage level by an amount which exceeds a predefined threshold value. As an alternative, the occurrence of a voltage event may be detected by detecting that a voltage monitored at one or more of the points of connection 8 differs differ from a predetermined voltage level by an amount which exceeds a predetermined threshold value. The detected voltage event may be an over-voltage event or an under-voltage event depending on whether the actual voltages at the point of common coupling 3 and/or at the points of connection 8 are above or below a specified voltage range.

Upon detecting that a voltage event is occurring, a current and a voltage at the point of common coupling 3 are determined, e.g., by direct measurements, and provided to the power plant controller 4. Since the determined current and voltage are obtained at the point of common coupling 3, they represent the current injected to the power grid 2 from the renewable power plant 1 and the actual voltage level in the power grid 2.

The power plant controller 4 then processes the determined current and voltage in a Data Condition Calculation block 9, and provides the processed current and voltage to a $\Delta I_Q$-V Control block 10. The $\Delta I_Q$-V Control block 10 derives a current setpoint correction for the whole renewable power plant 1, based on the processed current and voltage, i.e. an overall current setpoint correction indicating how much more or how much less current is needed for handling the occurring voltage event is derived by the $\Delta I_Q$-V Control block 10. The current setpoint correction for the whole renewable power plant 1 is provided from the $\Delta I_Q$-V Control block 10 to a $\Delta I$ Dispatcher block 11.

The $\Delta I$ Dispatcher block 11 derives individual current setpoint corrections for the wind turbines 5, based on the current setpoint correction for the whole renewable power plant 1.

The derived individual current setpoint corrections may be identical for all wind turbines 5. In this case the current setpoint correction for the whole renewable power plant 1 is simply divided by the number of wind turbines 5, and the result is the individual current setpoint corrections for the respective wind turbines.

Alternatively, the $\Delta I$ Dispatcher block 11 may derive current setpoint corrections which differ from one wind turbine 5 to another, i.e. each wind turbine 5 receives a current setpoint correction from the power plant controller 4 which is particular for that wind turbine 5. This may, e.g., be carried out by taking the conditions applying at the respective wind turbines 5 into account.

The $\Delta I$ Dispatcher block 11 further dispatches each derived current setpoint correction to wind turbine controllers 6 of the corresponding wind turbines 5.

Since the current setpoint corrections are based on the current and the voltage determined at the point of common coupling 3, the derived current setpoint corrections will reflect the determined current and voltage. Thus, any variations in the current and the voltage at the point of common coupling 3 will be accurately reflected in corresponding variations in the current setpoint corrections, and thereby the current setpoint corrections can accurately handle the actual conditions at the point of common coupling 3.

Furthermore, the derived current setpoint corrections take the detected voltage event in the power grid 2 into account, in the sense they reflect the type of voltage event detected, i.e. whether the detected voltage event is an over-voltage event or an under-voltage event.

Upon receipt of the current setpoint corrections, the wind turbine controller 6 controls the wind turbine 5 in the following manner. The wind turbine controller 6 is configured to perform setpoint control of the current output of the wind turbine 5, based on a current setpoint and measurements of current and voltage at the point of connection 8 between the wind turbine 5 and the internal grid 7, i.e. based on local measurements. The current setpoint may be the setpoint which is applicable under normal operating conditions, i.e. when a voltage event is not occurring. When no voltage event is occurring, the wind turbine 5 is simply controlled based on this current setpoint.

In the case that occurrence of a voltage event is detected, the wind turbine controller 6 receives the current setpoint corrections which were dispatched from the power plant controller 4.

The received current setpoint correction is then added to the current setpoint, thereby obtaining a corrected current setpoint. The current output of the wind turbine 5 is then controlled based on the corrected current setpoint and locally performed measurements of current and voltage. Thereby the current setpoint of the wind turbines is controlled in a dynamic manner due to the locally obtained measurements but also takes conditions at the point of common coupling into account, due to the correction added to the current setpoint.

Figure 2:
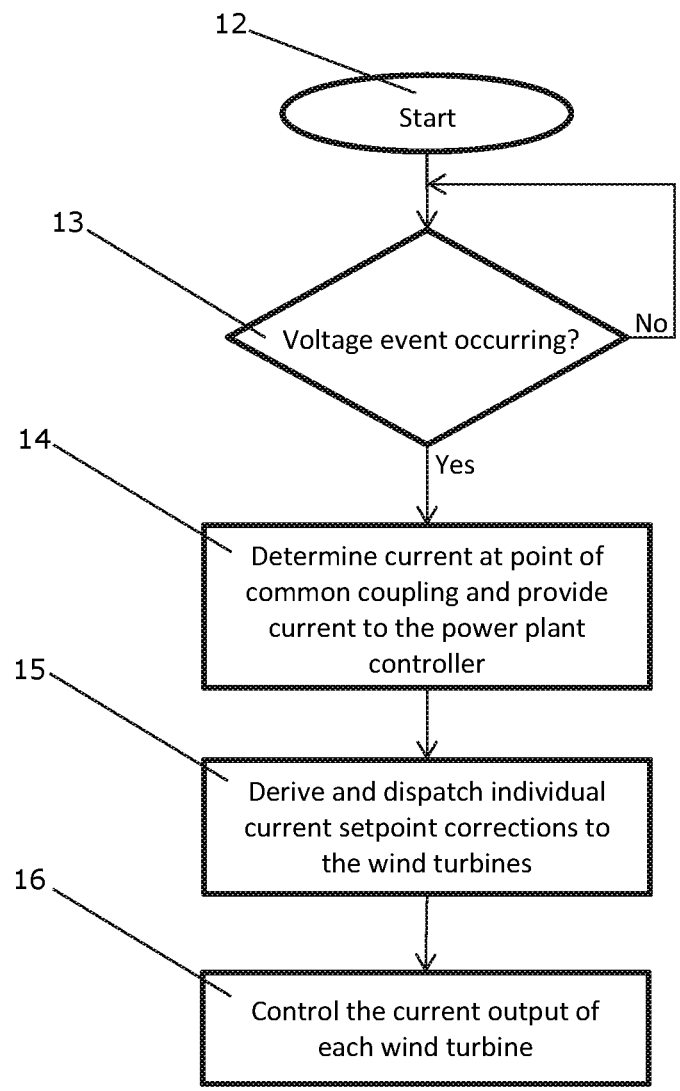
FIG. 2 is a flow chart illustrating a method according to an embodiment of the invention.

FIG. 2 is a flow chart illustrating a method according to an embodiment of the invention. The method is initiated at step 12.

In step 13, it is investigated whether a voltage event in the power grid has occurred or not. In the case that no voltage event in the power grid is detected, the state of the power grid continues to be monitored.

In the case that step 13 reveals that a voltage event is occurring in the power grid, the process is forwarded to step 14, where a current at a point of common coupling between the power grid and a renewable power plant is determined and provided to a power plant controller of the renewable power plant, e.g. in the manner described above with reference to FIG. 1.

In step 15, the power plant controller derives individual current setpoint corrections for at least some of the wind turbines within the renewable power plant, based on the determined current. Furthermore, the power plant controller dispatches each derived current setpoint correction to wind turbine controllers of the corresponding wind turbines. The current setpoint corrections may, e.g., be derived and dispatched in the manner described above with reference to FIG. 1.

In step 16, the wind turbine controllers control the current output of the respective wind turbines, based on measurements of current and/or voltage at a point of connection between the wind turbine and an internal grid of the renewable power plant, and by taking the current setpoint correction dispatched from the power plant controller into account. The current output of the wind turbines may, e.g., be controlled in the manner described above with reference to FIG. 1.

Figure 3:
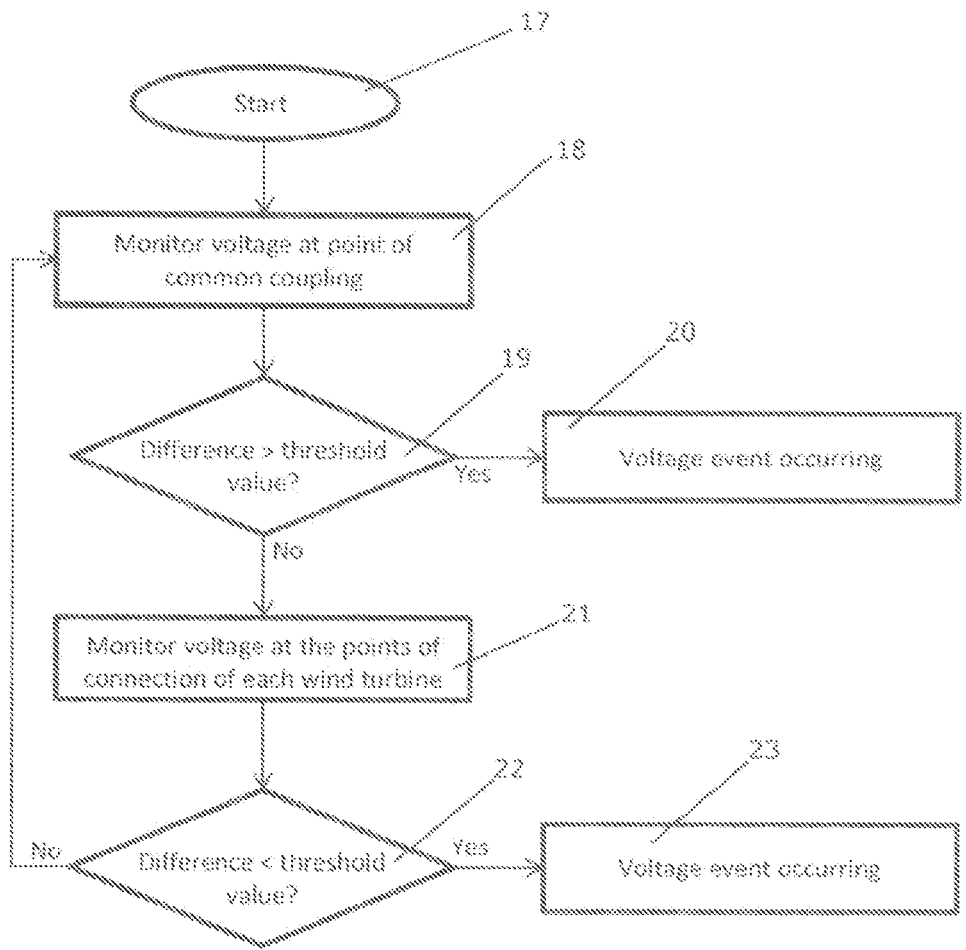
FIG. 3 is a flow chart illustrating detection of the occurrence of a voltage event as part of a method according to an embodiment of the invention.

FIG. 3 is a flow chart illustrating detection of the occurrence of a voltage event in a power grid as part of a method according to an embodiment of the invention. The flow chart of FIG. 3 may, e.g., be a method performed in step 10 of FIG. 2. The method is initiated at step 17. In step 18, voltage at a point of common coupling between the power grid and a renewable power plant is monitored, i.e. the voltage level of the power grid is monitored. The voltage at the point of common coupling may be monitored using various measurement devices such as phasor measurement units, power meters, etc. As an alternative, the voltage at the point of common coupling may be derived from other parameters, which could be measured and used for deriving the voltage, such as from a monitored current and/or a monitored power flow.

In step 19, it is investigated whether a difference between the monitored voltage at the point of common coupling and a predefined voltage level exceeds a predefined threshold value. The predefined voltage level may, e.g., be the voltage level of the power grid, and hence the voltage at the point of common coupling, under normal operating conditions. Thus, the difference between the monitored voltage and the predefined voltage indicates how much the monitored voltage deviates from the voltage at normal operating conditions. The predefined threshold value may indicate the maximum allowable difference between the actual voltage and the predefined voltage without risking critical voltage conditions.

In the case that the difference exceeds the predefined threshold value, it can be concluded that a voltage event is occurring, and the process is forwarded to step 20 in order to take appropriate measures in this regard.

In the case that step 19 reveals that the difference does not exceed the predefined threshold value, it can not be concluded that a voltage event is occurring, and the process is forwarded to step 21, where the voltage at points of connection between each wind turbine and an internal grid of the renewable power plant is monitored. Thus, the voltage monitored at the points of connection represents the voltage level of each wind turbine within the renewable power plant.

In step 22, it is investigated whether a difference between the monitored voltage at the point of connection between at least one wind turbine and the internal grid and a predefined voltage level exceeds a predefined threshold value, i.e. whether a difference exceeds a maximum allowable difference between the actual voltage at the point of connection and a predefined voltage level of the point of connection.

In the case that the difference exceeds the predefined threshold value, it is concluded that a voltage event is occurring, and the process is forwarded to step 23 in order to take appropriate measures in this regard.

In the case that step 22 reveals that the difference does not exceed the predefined threshold value, it is concluded that no voltage event is occurring, and the process is returned to step 18 in order to once again monitor the voltage at the point of common coupling.

Figure 4:
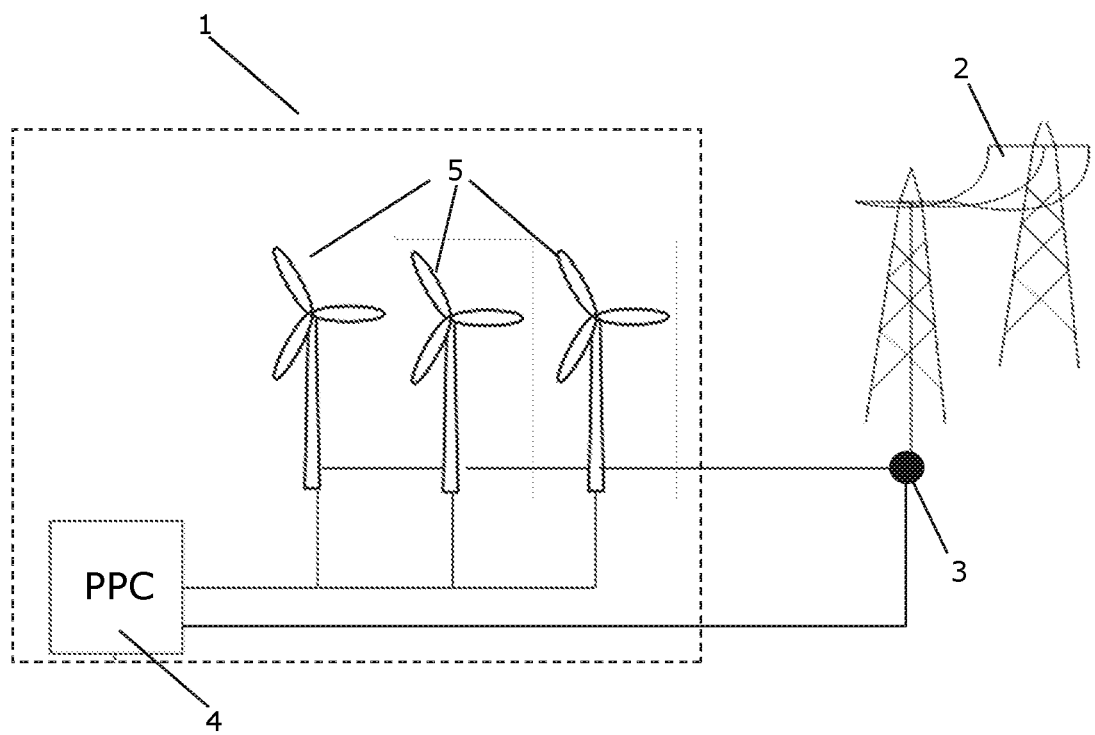
FIG. 4 illustrates a wind power plant being controlled in accordance with a method according to a first embodiment of the invention.

FIG. 4 illustrates a wind power plant 1 being controlled in accordance with a method according to a first embodiment of the invention. The wind power plant 1 comprises a plurality of wind turbines 5, three of which are shown, and the wind power plant 1 is, via point of common coupling 3, connected to a power grid 2. The wind power plant 1 further comprises a power plant controller 4 communicatively connected to the wind turbines 5. In the embodiment illustrated in FIG. 4, in the case that occurrence of a voltage event in the power grid 2 is detected, the power plant controller 4 derives and dispatches current setpoint corrections to each wind turbine 5, based on a current, and possibly a voltage, determined at the point of common coupling 3, e.g., in the manner described above with reference to FIG. 1, and the wind turbine controllers of the individual wind turbines 5 control the current output of the wind turbines 5 based on local measurements, while taking the received current setpoint corrections into account. Accordingly, the current output of each wind turbine 5, i.e. the current injected to the power grid 2 from the renewable power plant 1, is controlled in a dynamic, yet accurate manner, as described above.

Figure 5:
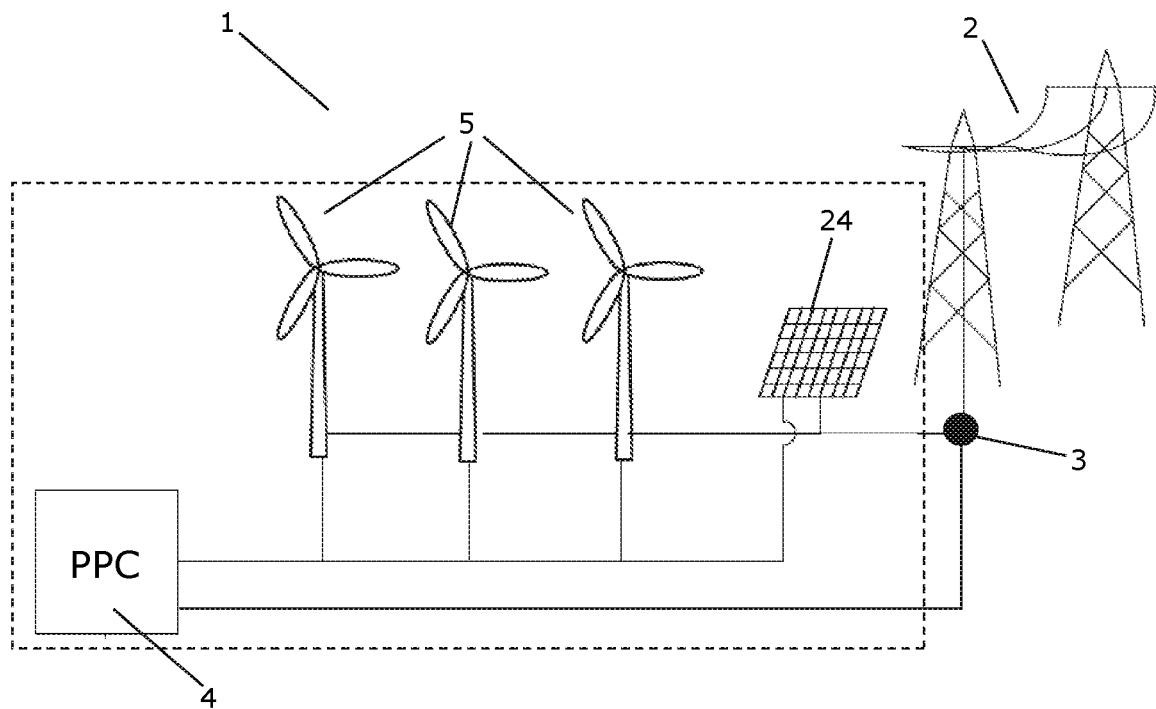
FIG. 5 illustrates a hybrid power plant being controlled in accordance with a method according to a second embodiment of the invention.

FIG. 5 illustrates a hybrid power plant 1 being controlled in accordance with a method according to a second embodiment of the invention. The hybrid power plant 1 of FIG. 5 is controlled in a manner which is very similar to the wind power plant 1 of FIG. 4, and it will therefore not be described in detail here.

However, the hybrid power plant 1 of FIG. 5 comprises two different types of renewable power generating units, i.e., wind turbines 5, as described above with reference to FIG. 4, and at least one photovoltaic panel 24. Thus, in the embodiment illustrated in FIG. 5, the power plant controller 4 derives and dispatches current setpoint corrections to the wind turbines 5 as well as to the photovoltaic panel 24. Accordingly, the current output of the wind turbines 5 and the photovoltaic panel 24 is controlled essentially in the manner described above with reference to FIG. 1.

The invention claimed is:

1. A method for controlling a current injected to a power grid from a renewable power plant, in response to a voltage event in the power grid, the renewable power plant comprising a plurality of wind turbines and a power plant controller, the method comprising:

detecting occurrence of the voltage event in the power grid;

determining at least a current at a point of common coupling between the renewable power plant and the power grid, and providing the determined current to the power plant controller;

deriving, by the power plant controller, individual current setpoint corrections for the plurality of wind turbines, based on the determined current, the derived current setpoint corrections taking the detected voltage event in the power grid into account;

dispatching, by the power plant controller, the derived current setpoint corrections to wind turbine controllers of the plurality of wind turbines;

measuring at least one of current or voltage at a point of connection between the plurality of wind turbines and an internal grid of the renewable power plant; and controlling, by the wind turbine controllers, current output of the plurality of wind turbines based on the individual current set point corrections and the measured at least one of current or voltage at the point of connection between the plurality of wind turbines and the internal grid.

2. The method of claim 1, wherein deriving the individual current setpoint corrections comprises deriving identical current setpoint corrections for the plurality of wind turbines.

3. The method of claim 1, wherein deriving the individual current setpoint corrections comprises deriving current setpoint corrections which differ from one wind turbine to another.

4. The method of claim 3, further comprising providing, by the wind turbine controllers, information to the power plant controller regarding current correction capabilities of the plurality of wind turbines, and wherein deriving the individual current setpoint corrections is performed in accordance with the provided current correction capabilities.

5. The method of claim 1, wherein deriving the individual current setpoint corrections comprises deriving individual current setpoint corrections having a magnitude which depends on a severity of the detected voltage event.

6. The method of claim 1, wherein detecting the occurrence of the voltage event comprises monitoring a voltage at point of connection between the plurality of wind turbines and the internal grid of the renewable power plant, and determining that the voltage event is occurring in the case that a difference between the monitored voltage and a predefined voltage level exceeds a predefined threshold value for at least one wind turbine of the plurality of wind turbines.

7. The method of claim 1, wherein detecting the occurrence of the voltage event comprises monitoring a voltage at the point of common coupling between the renewable power plant and the power grid, and determining that the voltage event is occurring in the case that a difference between the monitored voltage and a predefined voltage level exceeds a predefined threshold value.

8. The method of claim 1, further comprising determining a voltage at the point of common coupling, and providing the determined voltage to the power plant controller, and wherein deriving the individual current setpoint corrections is further based on the determined voltage.

9. The method of claim 1, wherein the voltage event is an under-voltage event, and wherein the individual current setpoint corrections are positive.

10. The method of claim 1, wherein the voltage event is an over-voltage event, and wherein the individual current setpoint corrections are negative.

11. The method of claim 1, wherein controlling the current output of the plurality of wind turbines comprises, for each wind turbine of the plurality of wind turbines:
providing a current setpoint;
adding the dispatched current setpoint correction to the current setpoint, thereby obtaining a corrected current setpoint; and
controlling the current output of the wind turbine in accordance with the corrected current setpoint.

12. A renewable power plant configured for controlling a current injected to a power grid from the renewable power plant, the renewable power plant comprising:
a plurality of wind turbines coupled to the power grid, and each wind turbine of the plurality of wind turbines having a respective wind turbine controller;
a power plant controller communicatively coupled to the respective wind turbine controllers; wherein the power plant controller is configured to:
responsive to a detected voltage event in the power grid, derive respective current setpoint corrections for the plurality of wind turbines, based on a determined current; the derived current setpoint corrections taking the detected voltage event in the power grid into account;
dispatch each derived current setpoint correction to a respective one of the wind turbine controllers; and
wherein, responsive to the respective derived current setpoint correction, the respective wind turbine controller (i) measures at least one of current or voltage at a point of connection between the respective wind turbine and an internal grid of the renewable power plant and (ii) controls a current output by the respective wind turbine, based on the respective derived current setpoint correction and the measured at least one of current or voltage at the point of connection between the at least some of the wind turbines and the internal grid.

13. The renewable power plant of claim 12, wherein the derived respective current setpoint corrections are identical current setpoint corrections for the plurality of wind turbines.

14. The renewable power plant of claim 12, wherein the derived respective current setpoint corrections are different for each of the plurality of wind turbines.

15. The renewable power plant of claim 12, wherein the wind turbine controllers are configured to provide information to the power plant controller regarding current correction capabilities of the plurality of wind turbines, and wherein the respective current setpoint corrections are derived in accordance with the provided current correction capabilities.

16. The renewable power plant of claim 12, wherein the respective derived current setpoint corrections have a magnitude dependent on a severity of the detected voltage event.

17. A method for controlling a current injected to a power grid from a renewable power plant comprising a plurality of wind turbines and a power plant controller, the method comprising:
by the power plant controller:
receiving a determined current at a point of common coupling between the renewable power plant and the power grid;
deriving respective current setpoint corrections for the plurality of wind turbines, based on the determined current; the derived current setpoint corrections taking a detected voltage event in the power grid into account; and dispatching the derived current setpoint corrections to wind turbine controllers of the plurality of wind turbines; and by the wind turbine controllers:

measuring at least one of current or voltage at points of connection between the plurality of wind turbines and an internal grid of the renewable power plant; and controlling current output of the plurality of wind turbines, based on the current set point corrections and the measured at least one of current or voltage at the point of connection between the plurality of wind turbines and the internal grid.

18. The method of claim 17, wherein the derived current setpoint corrections are different for each of the plurality of wind turbines.

19. The method of claim 17, further comprising, by the wind turbine controllers:

providing information to the power plant controller regarding current correction capabilities of the plurality of wind turbines, and wherein deriving the current setpoint corrections is performed in accordance with the provided current correction capabilities.

* * * * *